(12) United States Patent
Möri (10) Patent No.: US 8,695,484 B2
(45) Date of Patent: Apr. 15, 2014

(54) USED CAPSULE COLLECTOR FOR BEVERAGE DEVICES

(75) Inventor: Peter Möri, Walperswil (CH)

(73) Assignee: Nestec S.A., Vevey (CH)

( * ) Notice: Subject to any disclaimer, the term of this patent is extended or adjusted under 35 U.S.C. 154(b) by 176 days.

(21) Appl. No.: 12/988,295

(22) PCT Filed: May 6, 2009

(86) PCT No.: PCT/EP2009/055464
§ 371 (c)(1),
(2), (4) Date: Oct. 15, 2010

(87) PCT Pub. No.: WO2009/135869
PCT Pub. Date: Nov. 12, 2009

(65) Prior Publication Data
US 2011/0041698 A1 Feb. 24, 2011

(30) Foreign Application Priority Data
May 7, 2008 (EP) .................................... 08155753

(51) Int. Cl.
*A47J 31/40* (2006.01)
*A47G 19/00* (2006.01)

(52) U.S. Cl.
USPC .......................... 99/295; 220/908; 220/908.3

(58) Field of Classification Search
USPC ............. 99/289 R, 289 P, 290–295, 297, 300, 99/302 R, 302 P; 222/129.1; 220/495.06, 220/495.05, 495.08, 495.11, 506, 908, 220/908.1; 366/142, 160.1
See application file for complete search history.

(56) References Cited

U.S. PATENT DOCUMENTS

| | | | |
|---|---|---|---|
| 2,927,533 A | 3/1960 | Luehrs | |
| 3,218,955 A | 11/1965 | Lorang | 99/282 |
| 3,938,492 A | 2/1976 | Mercer, Jr. | |
| 4,164,306 A * | 8/1979 | Perrin | 222/181.2 |
| 4,253,385 A | 3/1981 | Illy | 99/281 |

(Continued)

FOREIGN PATENT DOCUMENTS

| AT | 410 377 B | 4/2003 |
|---|---|---|
| CH | 682 798 A5 | 11/1993 |

(Continued)

OTHER PUBLICATIONS

U.S. Appl. No. 12/747,841, Non-Final Office Action, dated Dec. 18, 2012.

(Continued)

*Primary Examiner* — Jianying Atkisson
(74) *Attorney, Agent, or Firm* — Winston & Strawn LLP (57) ABSTRACT

A device for preparing a beverage from a capsule containing an ingredient of the beverage, includes a housing with a cavity to which used capsules are evacuated; and a collection receptacle in the cavity of the housing. The receptacle has an opening for receiving the evacuated used capsules and collecting the capsules. The receptacle has a reception orientation in which the receptacle is arranged to be filled with capsules up to a maximum level of fill in the cavity which extends above the opening of the receptacle in the reception orientation of the receptacle. The receptacle being tiltable or pivotable in the cavity into a removal orientation for allowing removal of the collection receptacle filled with capsules from the cavity.

17 Claims, 2 Drawing Sheets

(56) References Cited

U.S. PATENT DOCUMENTS

| | | | |
|---|---|---|---|
| 4,377,049 A | 3/1983 | Simon et al. | 40/465 |
| 4,389,925 A * | 6/1983 | Piana | 99/289 R |
| 4,458,735 A | 7/1984 | Houman | 141/95 |
| 4,554,419 A | 11/1985 | King et al. | 200/5 |
| 4,757,753 A | 7/1988 | Pandolfi | |
| 4,767,632 A | 8/1988 | Meier | 426/231 |
| 4,954,697 A | 9/1990 | Kokubun et al. | 235/381 |
| 5,036,998 A * | 8/1991 | Dunn | 220/23.87 |
| 5,161,455 A | 11/1992 | Anson et al. | 99/280 |
| 5,193,701 A | 3/1993 | Bush et al. | |
| 5,312,020 A | 5/1994 | Frei | 222/129.1 |
| 5,335,705 A | 8/1994 | Morishita et al. | 141/275 |
| 5,353,692 A | 10/1994 | Reese et al. | 99/289 |
| 5,372,061 A | 12/1994 | Albert et al. | 99/281 |
| 5,375,508 A | 12/1994 | Knepler et al. | 99/280 |
| 5,498,757 A | 3/1996 | Johnson et al. | |
| 5,645,230 A | 7/1997 | Marogna et al. | 241/27 |
| 5,731,981 A | 3/1998 | Simard | 364/465 |
| 5,836,236 A | 11/1998 | Rolfes et al. | 99/290 |
| 5,855,161 A | 1/1999 | Cortese | |
| 5,890,615 A * | 4/1999 | Petras | 220/23.86 |
| 5,916,351 A | 6/1999 | Sintchak | |
| 5,927,553 A | 7/1999 | Ford | 222/129.4 |
| 5,959,869 A | 9/1999 | Miller et al. | 364/479.01 |
| 5,992,298 A | 11/1999 | Illy et al. | |
| 6,029,562 A | 2/2000 | Sintchak | 99/275 |
| 6,062,127 A | 5/2000 | Klosinski et al. | 99/303 |
| 6,123,010 A | 9/2000 | Blackstone | 99/284 |
| 6,182,555 B1 | 2/2001 | Scheer et al. | 99/290 |
| 6,213,336 B1 | 4/2001 | Lin | |
| 6,325,312 B1 | 12/2001 | Karkos, Jr. | |
| 6,345,570 B1 * | 2/2002 | Santi | 99/289 R |
| 6,354,341 B1 | 3/2002 | Saveliev et al. | 141/94 |
| 6,582,002 B2 * | 6/2003 | Hogan et al. | 296/37.12 |
| 6,759,072 B1 | 7/2004 | Gutwein et al. | 426/433 |
| 7,028,603 B1 | 4/2006 | Gremillion et al. | 99/290 |
| 7,093,533 B2 | 8/2006 | Tebo, Jr. et al. | |
| 7,210,401 B1 | 5/2007 | Rolfes et al. | 99/289 |
| 7,270,050 B2 | 9/2007 | Glucksman et al. | 99/297 |
| 7,279,660 B2 | 10/2007 | Long et al. | 219/441 |
| 7,350,455 B2 | 4/2008 | Vetterli | 99/280 |
| 2003/0070555 A1 | 4/2003 | Reyhanloo | 99/282 |
| 2004/0015263 A1 | 1/2004 | Chadwell et al. | 700/216 |
| 2005/0015263 A1 | 1/2005 | Beal et al. | 705/1 |
| 2005/0258186 A1 | 11/2005 | Hart et al. | |
| 2007/0062378 A1 * | 3/2007 | Glucksman et al. | 99/279 |
| 2007/0157820 A1 | 7/2007 | Bunn | 99/275 |
| 2007/0175338 A1 | 8/2007 | Glucksman et al. | |
| 2009/0101021 A1 | 4/2009 | Tonelli et al. | 99/290 |
| 2009/0173235 A1 | 7/2009 | Kollep et al. | 99/279 |
| 2010/0251900 A1 | 10/2010 | Cahen et al. | 99/323.1 |
| 2010/0263543 A1 | 10/2010 | Krauchi et al. | 99/280 |
| 2010/0263547 A1 | 10/2010 | Cahen et al. | 99/300 |
| 2010/0263550 A1 | 10/2010 | Cahen et al. | 99/323.1 |
| 2010/0300301 A1 | 12/2010 | Cahen et al. | 99/323.1 |

FOREIGN PATENT DOCUMENTS

| | | |
|---|---|---|
| CN | 2235252 Y | 9/1996 |
| CN | 1209041 A | 2/1999 |
| CN | 2387836 | 7/2000 |
| CN | 1875831 | 12/2006 |
| DE | 44 29 353 A1 | 2/1996 |
| DE | 20 2006 002 124 U1 | 5/2006 |
| DE | 20 2006 019 039 U1 | 4/2007 |
| DE | 102006060748 | 1/2008 |
| EP | 0 549 887 A1 | 7/1993 |
| EP | 0 838 186 A1 | 4/1998 |
| EP | 1 440 639 A1 | 7/2004 |
| EP | 1 448 084 B1 | 8/2004 |
| EP | 1 676 509 A1 | 7/2006 |
| EP | 1 707 088 A1 | 10/2006 |
| EP | 1 731 065 A1 | 12/2006 |
| EP | 1772081 A1 | 4/2007 |
| EP | 1 798 457 A1 | 6/2007 |
| EP | 1 859 713 A1 | 11/2007 |
| EP | 1 864 598 A1 | 12/2007 |
| EP | 1 867 260 A1 | 12/2007 |
| EP | 1 878 368 A1 | 1/2008 |
| EP | 1 731 065 B1 | 6/2008 |
| EP | 2 070 454 A1 | 6/2009 |
| FR | 2 440 720 A1 | 6/1980 |
| FR | 2 544 185 A3 | 10/1984 |
| FR | 2 624 844 A1 | 6/1989 |
| GB | 2 397 510 A | 7/2004 |
| GB | 2 421 423 A | 6/2006 |
| JP | 50054990 A | 5/1975 |
| JP | 51135081 U | 11/1976 |
| JP | 52138542 U | 10/1977 |
| JP | 54065788 U | 5/1979 |
| JP | S59174120 A | 10/1984 |
| JP | 61119218 A | 6/1986 |
| JP | H0638880 A2 | 2/1994 |
| JP | 2001222761 A | 8/2001 |
| JP | 2002191505 A | 7/2002 |
| JP | 2004527893 A | 9/2004 |
| JP | 2006341097 A | 12/2006 |
| LU | 85318 | 9/1984 |
| RU | 2294875 C2 | 3/2007 |
| SU | 1797482 A3 | 2/1993 |
| WO | WO97/24052 | 7/1997 |
| WO | WO 97/25634 A1 | 7/1997 |
| WO | WO 99/50172 A1 | 10/1999 |
| WO | WO 02/059534 A1 | 8/2002 |
| WO | WO02/070371 A2 | 9/2002 |
| WO | WO02/097927 A1 | 12/2002 |
| WO | WO 02/097927 A1 | 12/2002 |
| WO | WO 03/039309 A1 | 5/2003 |
| WO | WO 03/075629 A1 | 9/2003 |
| WO | WO 03/093142 A1 * | 11/2003 | B65F 1/06 |
| WO | WO 2004/030435 A2 | 4/2004 |
| WO | WO 2004/030438 A2 | 4/2004 |
| WO | WO 2005/099535 A2 | 10/2005 |
| WO | WO 2006/050900 A1 | 5/2006 |
| WO | WO 2006/063645 A1 | 6/2006 |
| WO | WO 2006/082064 A1 | 8/2006 |
| WO | WO 2006/090183 A2 | 8/2006 |
| WO | WO 2006/122916 A1 | 11/2006 |
| WO | WO 2007/003062 A1 | 1/2007 |
| WO | WO 2007/003990 A2 | 1/2007 |
| WO | WO 2007/141334 A1 | 12/2007 |
| WO | WO 2008/046837 A1 | 4/2008 |
| WO | WO 2008/104751 A1 | 9/2008 |
| WO | WO 2008/138710 A1 | 11/2008 |
| WO | WO 2008/138820 A1 | 11/2008 |
| WO | WO 2011/092644 | 8/2011 |

OTHER PUBLICATIONS

U.S. Appl. No. 12/747,794, Non-Final Office Action, dated Jan. 30, 2013.
U.S. Appl. No. 12/747,820, Restriction Requirement, dated Feb. 15, 2013.
U.S. Appl. No. 12/747,684 Non-Final Office Action dated Mar. 11, 2013.
Page 66 of the official Diary of Chile listing CL 3721-08 (corresponding to US 2010/0263543A1) dated Jan. 8, 2010.
Chilean Search Report for CL 372008 dated Feb. 7, 2011 (corresponding to US 2010-0263547A1).
CL-2023-07 cited in Chilean Search Report, CL 3720-08 dated Feb. 7, 2011 (corresponding to US 2009-0173235A1).
U.S. Appl. No. 12/747,743, Non-Final Office Action, dated Apr. 11, 2013.
U.S. Appl. No. 12/747,794, Final Office Action, dated Jun. 6, 2013.
International Search Report for Application No. PCT/EP2008/067072 mailed Oct. 9, 2009.
International Search Report for Application No. PCT/EP2008/067075 mailed Aug. 27, 2009.
International Search Report for Application No. PCT/EP2008/067077 mailed Oct. 14, 2009.
International Search Report for Application No. PCT/EP2008/067079 mailed Apr. 9, 2009.

(56) References Cited

OTHER PUBLICATIONS

International Search Report for Application No. PCT/EP2008/067083 mailed Apr. 16, 2009.
Request for grant of a European patent, Application No. EP 08155753.0 filed May 7, 2008 entitled "Used Capsule Collector for Beverage Devices".
Request for grant of a European patent, Application No. EP 08155851.2 filed May 8, 2008 entitled "Setting the Level of Fill in a Cup Used With a Beverage Dispenser".
European Search Report for Application No. EP 10167803.5 dated Aug. 27, 2010.
U.S. Appl. No. 12/747,684, filed Jun. 11, 2010 entitled "Modular Manufacturing of Beverage Production Machines".
U.S. Appl. No. 12/747,743, filed Jun. 11, 2010 entitled "Used Capsule or Pod Receptacle for Liquid Food or Beverage Machines".
U.S. Appl. No. 12/747,794, filed Jun. 11, 2010 entitled "Liquid Food or Beverage Machine Having a Drip Tray and a Cup Support".
U.S. Appl. No. 12/747,820, filed Aug. 11, 2010 entitled "Liquid Food or Beverage Machine with Combinable Accessories".
U.S. Appl. No. 12/747,841, filed Jun. 11, 2010 entitled "One Hand Carriable Liquid Food or Beverage Machine".

\* cited by examiner

USED CAPSULE COLLECTOR FOR BEVERAGE DEVICES

This application is a 371 filing of International Patent Application PCT/EP2009/055464 filed May 6, 2009.

FIELD OF THE INVENTION

The field of the invention pertains to used capsule collectors of machines for preparing beverages from an ingredient of the beverage supplied within a capsule to the machine.

BACKGROUND ART

Beverage preparation machines are becoming very popular whether at home or in offices. For instance, there are machines for the preparation of beverages such as coffee, tea, soup or other similar beverages, in which at least one ingredient of the desired beverage, for example ground coffee, is supplied within a capsule into a capsule extraction chamber of the machine.

The use of capsules, such as plastic and/or aluminium-based capsules for the preparation of beverages has many advantages. Capsules, in particular aluminium-based capsules, are hermetic or gas tight and thus can protect the beverage ingredient effectively during an extended period of time against the environment such as air, humidity or light, before use of the ingredient and thus prevent premature degradation of the ingredient. Furthermore, capsules of a beverage ingredient are easy to handle, hygienic, and their use involves less cleaning of the beverage preparation machine, in particular no significant part of the machine's extraction chamber comes into contact with the beverage ingredient contained in the capsule during the extraction process.

Capsules are usually inserted individually into the machine's extraction chamber, manually or automatically from a capsule stack. Hot or cold water is then passed through the capsule for brewing or otherwise extracting the ingredient(s) contained within the capsule and form the desired beverage. The prepared beverage is supplied via an outlet of the machine into a cup, mug or other receptacle to the user.

Used capsules may either be removed individually from the beverage preparation machine after each beverage preparation or they may be collected in a machine's used capsule collector for instance as mentioned in EP 1 731 065 (in the name of the present Applicant).

Typically, the capsule collector is located underneath the capsule chamber so that the capsules may fall by gravity into the collector upon extraction. In the latter case, the collector has to be emptied by the user when full. The collector may be a drawer-type removable receptacle located in a cavity of the beverage preparation machine typically under the extraction chamber. The used capsule collector may be slid in and out of the machine's housing.

A problem may arise with such capsule collectors, in particular in conjunction with rigid capsules, when used capsules accumulate in the receptacle form a heap of capsules whose top extends above the receptacle in such a manner to come into conflict with the housing when the receptacle is slid out of the machine's housing for emptying.

A solution to avoid the jamming of the collector by used capsules is to provide an optical level detector for measuring the level of capsules in the used capsule collector and inviting the user to empty the collector when the level of capsules comes close to the level of the machine's housing. Another solution involves counting the number of capsule extractions after emptying the collector and inviting the user to empty the collector after a predetermined number of capsules has been collected, an excess of which may possibly cause jamming.

A drawback with the level detector system involves the use of expensive electronic detectors, in particular optical detectors. Furthermore, since the accumulated capsules naturally form a heap in the receptacle a waste of space is usually also involved around this heap. A drawback of the capsule counting system lies in the fact that, in order to avoid jamming at all time, it is necessary to set a maximum number of collectible capsules in the receptacle that will often lead to a poor filling of the collector at the time when the user will be invited to re-empty the collector and to an even greater waste of space around the heap of collected capsules in the receptacle than with the above described level detector.

Hence, there is still a need to provide an inexpensive simple solution for avoiding jamming of a used capsule collector in a coffee machine while allowing optimal filling of the collector.

SUMMARY OF THE INVENTION

The invention thus relates to a device for preparing a beverage from a capsule containing an ingredient of the beverage to be prepared. The beverage preparation device comprises: a housing having a cavity to which extracted capsules are evacuated; and a collection receptacle in the cavity of the housing, the receptacle having an opening for receiving the evacuated extracted capsules and collecting the capsules. Furthermore, the receptacle has a reception orientation in which the receptacle is arranged to be filled with capsules up to a maximum level of fill in the cavity. For emptying the capsules collected in the receptacle, the collection receptacle is removable from the cavity.

The beverage preparation device may have an extraction chamber for receiving such capsules, for extracting their beverage ingredient to form the beverage, and for evacuating extracted used capsules to the cavity of the housing, in particular by gravity. The capsules, even after use, typically have a certain rigidity that will inhibit their deformation. For example, the capsules are made of metal, such as aluminium, and/or of a plastic material, in particular a thermoplastic material.

In accordance with the invention, this maximum level of fill of capsules in the cavity extends above the opening of the receptacle when the receptacle is in its reception orientation. Moreover, the receptacle is tiltable or pivotable in the cavity into a removal orientation for allowing removal of the collection receptacle filled with capsules out of the cavity.

As mentioned above, used capsules that drop into the collection receptacle via the receptacle's opening accumulate in the form of a heap in the receptacle. This heap of capsules may rise up to the maximum level of fill. This maximum level of fill is located above the opening of the receptacle when the receptacle is in its reception orientation.

If a state of the art collector arrangement is used, typically a drawer-type receptacle, pulling the receptacle out from the cavity will be inhibited by the top of the heap of capsules extending above the receptacle's opening, which top will collide with the fixed outer wall of the device's housing that more or less matches the upper edge of the front wall of the movable capsule receptacle. In this situation, the receptacle will be jammed by the capsules in the cavity and the user will be faced with the problem of unjamming the receptacle.

By tilting or pivoting the receptacle in the cavity for the removal of the receptacle from the cavity in accordance with the present invention, the heap of capsules in the receptacle is tilted or pivoted at the same time so that the top of the heap is lowered with respect to the cavity and/or the heap of capsule is redistributed in the receptacle by the tilting or pivoting motion whereby the height of the heap is lowered in the receptacle. In both cases, the level of the accumulated capsules is lowered with respect to the housing's cavity so as to avoid, during removal of the receptacle from the cavity, a collision between the capsules and the device's housing that would lead to jamming problems of the receptacle in the cavity.

In an embodiment, the housing comprises a beverage conditioning part and a drip tray part, the cavity being delimited by the beverage conditioning part and the drip tray part. The drip tray part may be separable from the beverage conditioning part, the collection receptacle being optionally arranged to be tiltable or pivotable and removable by the separation of the drip part from the beverage conditioning part. The drip tray part typically comprises a drip tray, a rear part of the drip tray part forming a bottom part of the cavity for the collection receptacle, the drip tray being in particular covered with a support member, such as a grid, for holding a beverage recipient. Typically, the drip tray forms a reservoir for collecting liquid passing through the support member. The support member may be arranged to secure the capsule collection receptacle in its reception orientation.

The cavity of the housing may have: a front opening for inserting and removing the collection receptacle; and a bottom with a generally upright protruding portion, wall or wedge forming a pivot axis adjacent the front opening around which the collection receptacle is tiltable or pivotable in the cavity. Optionally, the collection receptacle has in its reception orientation a bottom that is angled up from adjacent the pivot axis so as to increase the angle by which the collection receptacle can be tilted or pivoted.

The cavity may have a bottom that supports a bottom part of the collection receptacle, the bottom part of the collection receptacle being tiltable or pivotable with the bottom of the cavity. In this case, the bottom of the cavity and the bottom of the receptacle move together from the reception orientation into the removal orientation, and vice versa.

Instead of providing the tilting or pivoting point at the bottom of the cavity in the housing, the collection receptacle can for example be suspended in the cavity along a top axis that extends substantially parallel to the opening in the top part of the receptacle, the collection receptacle being tiltable or pivotable around the top axis.

The cavity may have at least one cam cooperating with at least one corresponding cam follower of the collection receptacle, or vice versa, the cam(s) and cam follower(s) being arranged to guide the receptacle in a tilting or pivoting movement in the cavity.

The cavity of the housing may have a front opening for inserting and removing the collection receptacle and a rear passage, opposite the front opening, for allowing the passage of a rear part of the collection receptacle when the receptacle is tilted or pivoted in the cavity into its removal orientation. The rear passage may be delimited by an upright wall of the cavity, in particular an upright wall extending upwards from a bottom part of the cavity. The collection receptacle can have a rear wall with a shoulder, ledge or protrusion that cooperates with an upper edge of the upright wall of the cavity to secure the receptacle in its removal orientation or in its reception orientation.

The cavity and the collection receptacle may have a fastening arrangement for securing the receptacle in its reception orientation in the cavity. For instance, the fastening arrangement comprises one or more snap fasteners, and/or the fastening arrangement comprises a support opening or member in the cavity that cooperates with a corresponding suspension flange, protrusion or pin of the collection receptacle, or vice versa.

The collection receptacle in the cavity of the housing may have an apparent wall, i.e. a wall that is not fully hidden in the cavity, which has over its height a transparent or translucide portion. Hence, the user may visually check through this transparent or translucide portion the level of used capsules in the collection receptacle and remove the collection receptacle when he finds out that the receptacle is full or nearly full.

On the other hand, by using the tiltable or pivotable receptacle of the invention, a user may let the receptacle be filled with used capsules beyond the rim or opening of the collection receptacle and possibly up to the extraction chamber. When the amount of collected used capsules in the receptacle is so important that a further capsule may not be evacuated anymore from the extraction chamber, the heap of collected used capsules reaching the extraction chamber, the user will have to tilt or pivot the collection receptacle in such a way to redistribute the heap of capsules within the receptacle and to allow evacuation of the extracted capsule from the extraction chamber and removal of the collection receptacle from the cavity for emptying the used capsules collected in the receptacle.

BRIEF DESCRIPTION OF THE DRAWINGS

The invention will now be described with reference to the schematic drawings, wherein.

DETAILED DESCRIPTION

Figure 1:
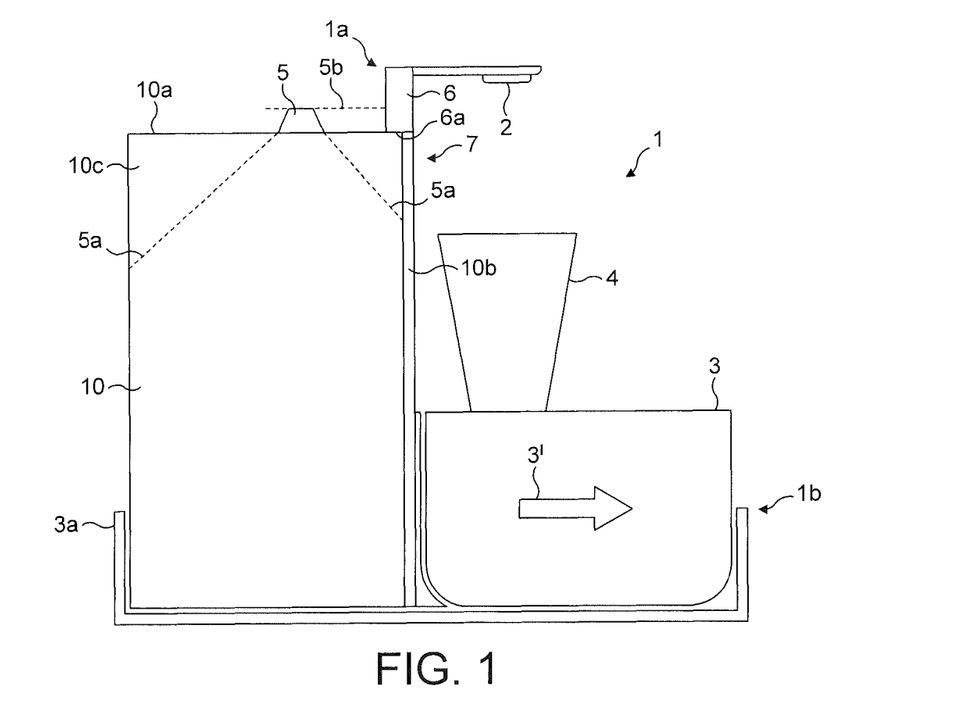
FIG. 1 shows a state of the art capsule collector arrangement of a beverage preparation device.

FIG. 1 schematically shows part of a beverage preparation device 1 with a beverage outlet 2 above a drip tray 3 that supports a cup 4 to be filled with beverage via outlet 2.

Beverage preparation device 1 has an extraction chamber (not shown) for receiving capsules containing an ingredient of the beverage to be prepared, for extracting the beverage ingredient to form the beverage and supplying the formed beverage via outlet 2 to cup 4. The extraction chamber is arranged to drop the extracted used capsules 5 into a cavity of the housing containing a capsule collection receptacle 10.

The cavity containing receptacle 10 is delimited by a two-part housing 1a,1b made of an upper beverage conditioning part 1a, an upper front wall 6 of which being shown in FIG. 1, and a lower drip tray part 1b made of a base tray 3a that supports drip tray 3 and collection receptacle 10. Base tray 3a, drip tray 3 and collection receptacle 10 are removable en bloc like a drawer from beverage preparation device 1 in the direction of arrow 3'. A lower edge 6a of upper front wall 6 delimits an upper boundary of opening 7 in beverage preparation device 1. Through opening 7, collection receptacle 10 may be removed from device 1. Collection receptacle 10 has a transparent front wall 10b that is more or less in the continuity of upper front wall 6 and comes close to or into contact with edge 6a.

Drip tray 3, base tray 3a and collection receptacle 10 may be made of different elements or may be joined into one or two elements. When drip tray 3 is assembled to collection receptacle 10 or integral therewith, base tray 3a may become redundant.

During use of beverage preparation device 1, capsules 5 are extracted in an extraction chamber and then dropped through the receptacle's opening 10a into receptacle 10 where they accumulate into a heap, the upper boundaries of which are schematically shown by dotted lines 5a.

When no particular system is provided to manage the accumulation of capsules in receptacle 10, this heap of capsules 5 may rise up to a level, that is indicated by dashed line 5b, which is located above opening 10a of receptacle 10, or the heap may rise even above level 5b. As shown in FIG. 10, level 5b is located above edge 6a of wall 6 and thus above opening 7 for the removal of collection receptacle 10.

Hence, by pulling collection receptacle 10 out from the cavity in direction 3', capsules 5 will collide with wall 6 of the housing's upper beverage conditioning part 1a. Depending on the disposition and amount of accumulated capsules 5 in receptacle 10 and extending above opening 7, the removal or receptacle 10 will be inhibited by the top of the heap of capsules 5, which top will collide with the fixed outer wall 6 of the device's housing 1a. In this case, receptacle 10 may be jammed by capsules 5 and the user will be faced with the problem of unjamming receptacle 10.

In order to allow a smooth removal of collection receptacle 10 shown in FIG. 1, capsules 5 should not accumulate beyond the receptacle's opening 10a. However, this leads to filling receptacle 10 with fewer capsules 5 which means a greater waste of space due to unoccupied areas 10c around heap 5a in receptacle 10 and thus this necessitates a receptacle with an increased size for coping with this waste of space.

Figure 2:
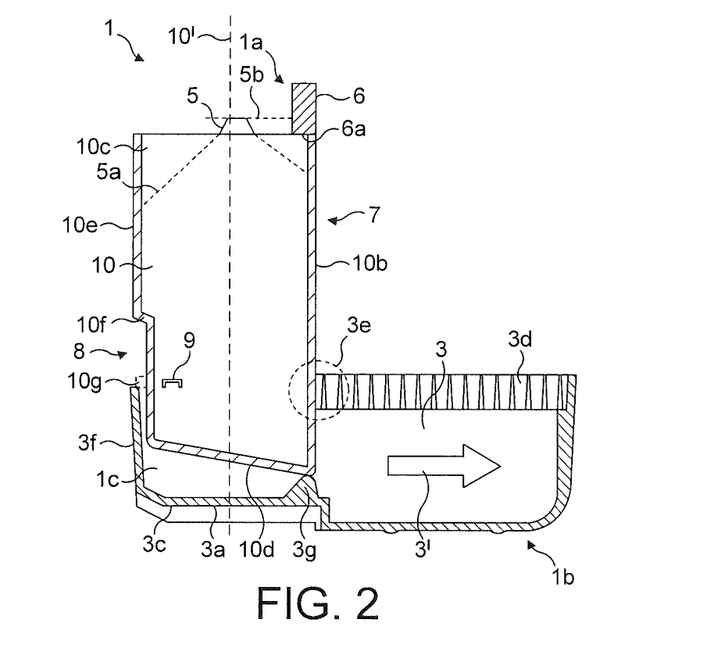
FIG. 2 shows a capsule collector arrangement of a beverage preparation device in accordance with the invention.
Figure 3:
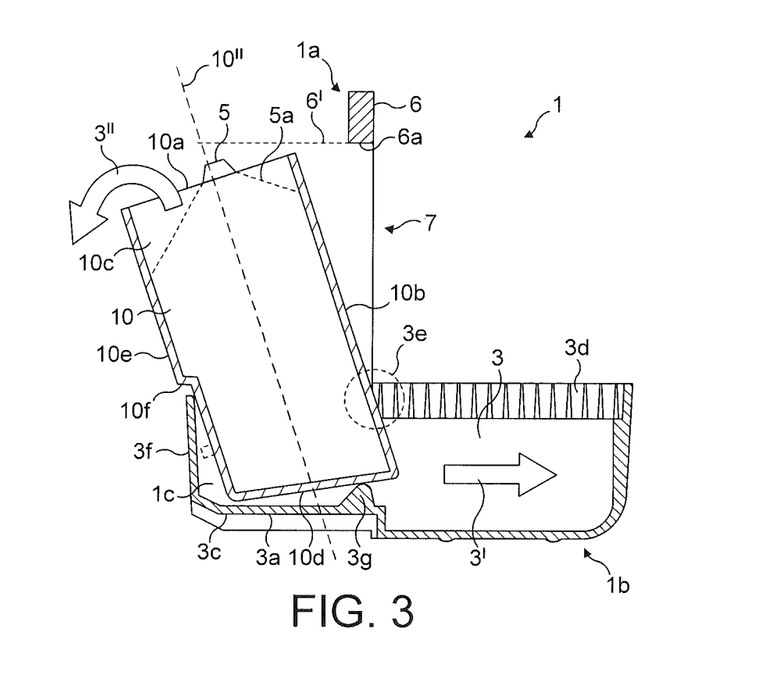
FIG. 3 illustrates the removal of the capsule collector of the arrangement shown in FIG. 2.

A solution to this problem is shown in FIGS. 2 and 3, in which the same references designate generally the same elements, which illustrate part of a beverage preparation device 1 according to the invention.

As opposed to the state of the art device shown in FIG. 1, the beverage preparation device shown in FIGS. 2 and 3 has a collection receptacle 10 that may take two different orientations in the cavity delimited by the two-part housing 1a,1b. More specifically, collection receptacle 10 is shown in FIG. 2 in a generally upright reception orientation, as indicated by vertical dashed line 10', and in a tilted or pivoted removal orientation, as indicated in FIG. 3 by inclined dashed line 10", that is at an angle to the reception orientation. The angle between the reception orientation and the removal orientation may be in the range of 5 to 60 deg, usually 10 to 45 deg, in particular 15 to 30 deg.

As generally illustrated in FIGS. 2 and 3, receptacle 10 may be filled in its reception orientation (FIG. 2) with capsules 5 to a level 5b beyond the receptacle's opening 10a and above edge 6a delimiting opening 7. This filled receptacle 10 may still be able, upon tilting or pivoting receptacle 10 into its removal orientation 10" (FIG. 3), to be removed for emptying and pass below the level 6' of edge 6a despite an accumulation of capsules 5 extending out of opening 10a of receptacle 10, without risk of jamming of receptacle 10 in housing 1a,1b.

In the schematic illustration of FIG. 3, the capsule arrangement forming a heap indicated by doted lines 5a, appears to be unchanged in receptacle 10 with respect to the arrangement of capsules 5 in receptacle shown in FIG. 2. It is clear that the capsule arrangement in receptacle may be modified in the tilting or pivoting motion, indicated by arrow 3". In particular, capsules 5 located in an upper region of the arrangement may move to previously unoccupied areas 10c of receptacle 10, underneath the receptacle's opening 10a. Thus a greater compactation of used capsules 5' may be achieved in receptacle 10 and less space is need in the beverage preparation device 1 to accumulate and handle the same number of used capsules 5 as with prior art arrangements of used capsule collection receptacles.

The device's housing 1a,1b comprises a beverage conditioning part 1a containing an extraction chamber and a liquid management system, such as a water reservoir, pump and heater (not shown), and a drip tray part 1b. Cavity 1c containing receptacle 10 is delimited by the beverage conditioning part 1a and the drip tray part 1b. Drip tray part 1b is separable from the beverage conditioning part 1a, collection receptacle 10 being arranged to be tiltable or pivotable and removable by the separation of the drip part 1b from the beverage conditioning part 1a, as shown by arrows 3' and 3" in FIG. 3.

Drip tray part 1b includes a base tray 3a, a drip tray 3, a rear part of base tray 3a forming a bottom part 3c of the cavity 1c for collection receptacle 10. Drip tray 3 is covered with a support member 3d, such as a grid, for holding a beverage recipient 4. Drip tray 3 forms a reservoir for collecting liquid passing through support member 3d.

In area 3e, support member 3d urges recipient 10 in its reception orientation against upright wall 3f of base tray 3a. Indeed, as illustrated in FIG. 3, receptacle may not be tilted or pivoted in cavity 1c without interfering with support member 3d in area 3e if support member 3d is not first removed to set recipient 10 free in rotation.

Furthermore, drip tray part 1b forming a bottom part 3c delimiting cavity 1c has a generally upright protruding wedge 3g forming a pivot axis adjacent front opening 7 around which collection receptacle 10 is tiltable or pivotable in cavity 1c. Moreover, collection receptacle 10 has in its reception orientation 10' a bottom 10d that is angled up from adjacent wedge 3g. As apparent in FIG. 3, such an angled receptacle's bottom 10d allows receptacle 10 to be tilted or pivoted over a greater angle before its bottom 10d hits bottom part 3c of housing 1a,1b.

Cavity 1c of the housing 1a,1b has a rear passage 8, opposite front opening 7, for allowing the passage of a rear wall 10e of collection receptacle 10 when the receptacle is tilted or pivoted into its removal orientation 10" in cavity 3c. Rear passage 8 is delimited by upright wall 3f of base tray 3a. Moreover, rear wall 10e of collection receptacle 10 has a shoulder 10f that may cooperate with an upper end of upright wall 3f to secure receptacle 10 in its removal orientation 10" or in its reception orientation. Rear wall 10e of collection receptacle 10 may also have a protrusion or ledge, indicated in dotted line 10g, that may cooperate with an upper end of upright wall 3f to secure receptacle 10 in its reception orientation 10'.

Cavity 1c and collection receptacle 10 have a fastening arrangement 9 in the form of a snap for securing receptacle 10 in its reception orientation 10' cavity 1c.

As long as collection receptacle 10 does not contain an accumulation of used capsules 5 that extends beyond its rim or opening 10a, receptacle 10 together with base tray 3a, drip tray 3 and support member 3d may be separated en bloc from upper beverage conditioning part 1a of the device's housing 1a,1b without tilting or pivoting receptacle 10. In other words, as shown in FIG. 2, lower drip tray part 1b and receptacle 10 may be removed en bloc, in the direction of arrow 3', with the receptacle in its reception orientation providing receptacle 10 does not contain an accumulation of capsules 5 that significantly emerges above opening 10a of receptacle 10.

When collection receptacle 10 contains an accumulation of used capsules 5 that noticeably emerges beyond its rim or opening 10a, support member or grid 3d should be removed and then receptacle 10 together with base tray 3a, drip tray 3 may be pulled away, in the direction of arrow 3', from upper beverage conditioning part 1a of the device's housing 1a,1b. By pulling base tray 3a with receptacle 10 away from conditioning part 1a, capsules 5 emerging from receptacle 10 will collide with wall 6 and push the upper part of receptacle 10 backwards so that receptacle 10 is naturally tilted or pivoted around protruding wedge 3g, in the direction of arrow 3" in FIG. 3, so as to allow the filled receptacle 10 to pass smoothly underneath wall 6. Alternatively, upon removal of support member or grid 3d, receptacle may be first tilted or pivoted in the direction of arrow 3" and then pulled with base tray 3a in the direction of arrow 3'.

What is claimed is:

1. A device for preparing a beverage from a capsule containing an ingredient of the beverage, comprising:
    a housing having a cavity to which used capsules are evacuated; and
    a collection receptacle located within the cavity of the housing, with the receptacle having an opening for receiving the evacuated used capsules and collecting the capsules, a reception orientation in which the receptacle is arranged to be filled with capsules up to a maximum level of fill in the cavity, and a removal orientation configured and dimensioned to allow removal of the collection receptacle filled with capsules from the cavity;
    wherein the cavity of the housing has a front opening for inserting and removing the collection receptacle, a pivot axis adjacent the front opening around which the collection receptacle is tiltable or pivotable within the cavity, the collection receptacle having a bottom that is angled up from the pivot axis when the receptacle is in its reception orientation, and a rear passage, opposite the front opening, for allowing the passage of a rear part of the collection receptacle when the receptacle is tilted or pivoted in the cavity into its removal orientation; and
    wherein the maximum level of fill of the collection receptacle extends above the opening of the receptacle in the reception orientation of the receptacle, while still allowing the collection receptacle to be tilted or pivoted into its removal orientation for removal of the collection receptacle filled with capsules from the cavity when the maximum level of fill in the cavity is reached.

2. The beverage preparation device of claim 1, wherein the housing comprises a beverage conditioning part and a drip tray part, with the cavity being delimited by the beverage conditioning part and the drip tray part, the drip tray part being separable from the beverage conditioning part, and the collection receptacle being arranged to allow the drip part to be separated from the beverage conditioning part.

3. The beverage preparation device of claim 2, wherein the drip tray part comprises a drip tray, a rear part of the drip tray part forming a bottom part of the cavity for the collection receptacle, the drip tray being covered with a support member or grid for holding a beverage recipient.

4. The beverage preparation device of claim 3, wherein the support member is arranged to secure the capsule collection receptacle in its reception orientation.

5. The beverage preparation device of claim 1, wherein the cavity of the housing has a bottom with an upright protruding portion, wall or wedge forming the pivot axis adjacent the front opening around which the collection receptacle is tiltable or pivotable in the cavity.

6. The beverage preparation device of claim 1, wherein the cavity has a bottom that supports a bottom part of the collection receptacle, the bottom part of the collection receptacle being tiltable or pivotable with respect to the bottom of the cavity.

7. The beverage device of claim 1, wherein the collection receptacle is suspended in the cavity along a top axis that extends substantially parallel to the opening in the top part of the receptacle, the collection receptacle being tiltable or pivotable around the top axis.

8. The beverage preparation device of claim 1, wherein the cavity has at least one cam cooperating with at least one corresponding cam follower of the collection receptacle, or vice versa, the cam(s) and cam follower(s) being arranged to guide the receptacle in a tilting or pivoting movement in the cavity.

9. The beverage preparation device of claim 1, wherein the rear passage is delimited by an upright wall of the cavity.

10. The beverage preparation device of claim 9, wherein the collection receptacle has a rear wall with a shoulder, ledge or protrusion that cooperates with an upper edge of the upright wall of the cavity to secure the receptacle in its removal orientation or in its reception orientation.

11. The beverage preparation device of claim 1, wherein the cavity and the receptacle have a fastening arrangement for securing the receptacle in its reception orientation in the cavity.

12. The beverage preparation device of claim 11, wherein the fastening arrangement comprises one or more snap fasteners.

13. The beverage preparation device of claim 11, wherein the fastening arrangement comprises a support opening or member in the cavity that cooperates with a corresponding suspension flange, protrusion or pin of the collection receptacle, or vice versa.

14. The beverage preparation device of claim 1, wherein the collection receptacle in the cavity of the housing has a transparent or translucent front wall that extends above the opening of the receptacle.

15. A device for preparing a beverage from a capsule containing an ingredient of the beverage, comprising:
    a housing having a cavity to which used capsules are evacuated, the cavity including a bottom;
    a collection receptacle in the cavity of the housing having an opening for receiving and collecting used capsules, a reception orientation in the device in which the receptacle is arranged to be filled with capsules up to a maximum level of fill in the cavity, and a removal orientation which allows removal of the collection receptacle filled with capsules from the cavity;
    wherein the cavity has a front opening for inserting and removing the collection receptacle, the maximum level of fill extends above the opening of the receptacle in the reception orientation of the receptacle, and the bottom includes a upright protruding portion, wall or wedge forming a pivot axis, whereby the receptacle is tiltable or pivotable within the cavity and said pivot axis; and
    wherein the collection receptacle is removable from the cavity for emptying capsules collected in the receptacle; by being tilted or pivoted about the pivot axis in the cavity into the removal orientation, thereby allowing removal of the collection receptacle filled with capsules from the cavity when the maximum level of fill in the cavity is reached.

16. The device of claim 15, wherein the collection receptacle is arranged to be slidably removable from the bottom of the cavity with the sliding movement urging the collection receptacle to tilt or pivot to facilitate removal from the cavity.

17. The device of claim 16, wherein the the cavity is further configured and arranged to include a support member or grid adjacent to the front opening for inserting and removing the collection receptacle, which is configured and dimensioned to hold a beverage recipient, with the support member or grid positioning the waste receptacle for receiving spent capsules.

* * * * *

UNITED STATES PATENT AND TRADEMARK OFFICE
CERTIFICATE OF CORRECTION

PATENT NO.        : 8,695,484 B2
APPLICATION NO.   : 12/988295
DATED             : April 15, 2014
INVENTOR(S)       : Möri et al.

It is certified that error appears in the above-identified patent and that said Letters Patent is hereby corrected as shown below:

In the Claims

Column 8:
Line 33 (claim 14, line 3), after "wall", change "that-extends" to -- that extends --.
Line 52 (claim 15, line 18), after "cavity" change "and" to -- around --.
Line 54 (claim 15, line 20), change "receptacle;" to -- receptacle --.
Line 64 (claim 17, line 1), after "wherein", delete the second occurrence of "the".

Signed and Sealed this
First Day of July, 2014

Michelle K. Lee
*Deputy Director of the United States Patent and Trademark Office*